INVENTOR
HENRY R. STRATFORD
By Reynolds, Beach & Christensen
ATTORNEYS

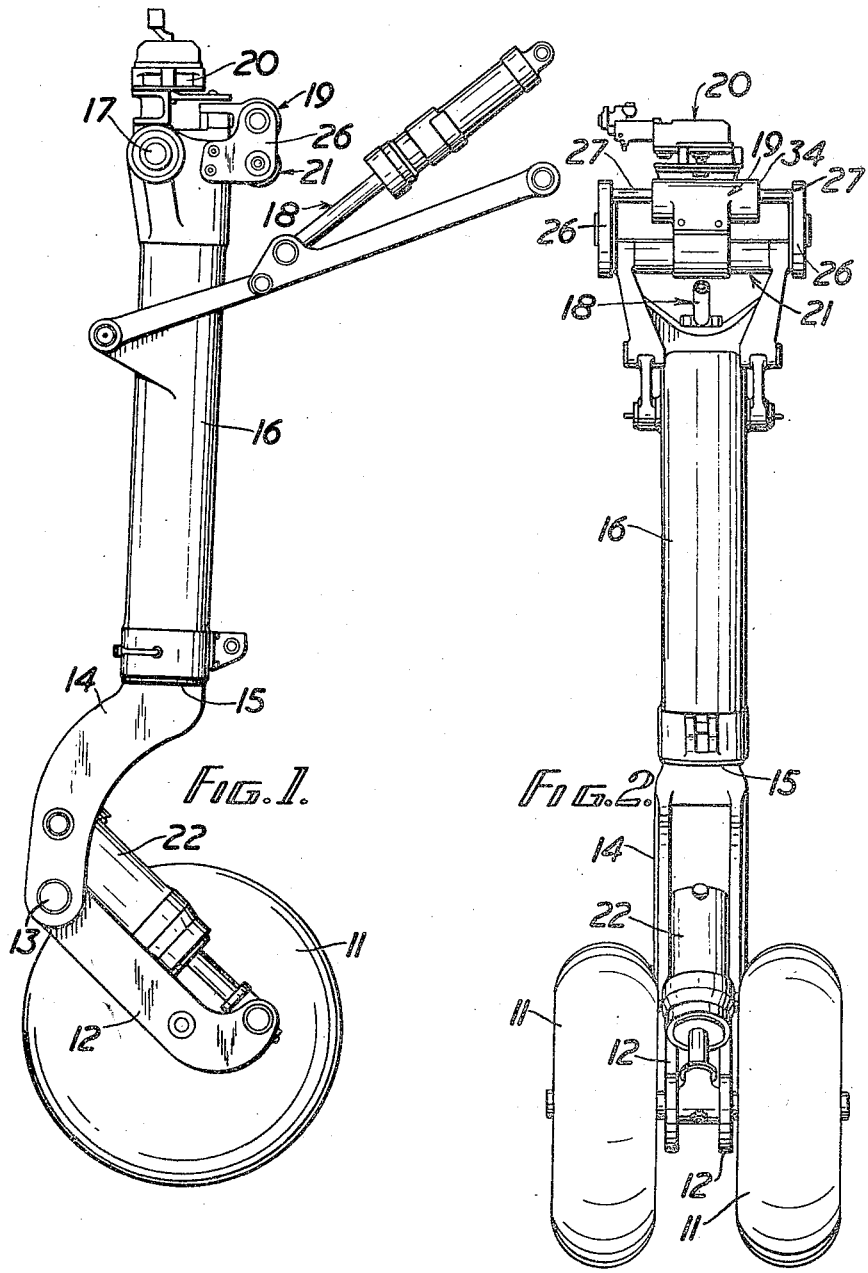

INVENTOR
HENRY R. STRATFORD
BY Reynolds, Beach & Christensen
ATTORNEYS

UNITED STATES PATENT OFFICE 2,613,888

AIRCRAFT CASTORABLE OR STEERABLE LANDING ELEMENT MOUNTINGS

Henry R. Stratford, Cheltenham, England, assignor to Dowty Equipment Limited, Cheltenham, England Application August 1, 1950, Serial No. 177,046
In Great Britain April 19, 1949

8 Claims. (Cl. 244—50)

This invention relates to aircraft castorable or steerable nose-wheel or tail-wheel mountings with which is associated a single double-acting hydraulic cylinder-and-piston device arranged substantially tangentially of the castoring or steering axis and operative, in a castorable mounting, as a hydraulic dash-pot to damp shimmy, and, in a steerable mounting, as the motor means for providing steering efforts, with or without shimmy damping. The invention seeks to provide improved drive transmission means between linear movements of the movable element of the hydraulic device on the one hand and rotary movements of the column on the other hand, affording greater compactness and, in a steerable mounting, more uniform mechanical efficiency throughout the two-way steering range.

According to this invention, the movable element of the hydraulic device and the rotatable column are in driving connection with one another by two extensible links connecting opposite ends respectively of said element with a crank pin on the column, the arrangement being such that when the column and the movable hydraulic element occupy their normal mid positions, the two links are fully contracted, preferably in alignment on an axis which is substantially tangential of the path of movement of the crank pin.

If the rotatable column, whether steerable or non-steerable, is to be capable of castoring throughout 360 degrees, the two links will be pivotally connected with the column at the upper end of the latter, as set forth in United States Letters Patent in the name of George H. Dowty, No. 2,543,233, issued February 27, 1951, and copending herewith.

In order that the invention may be more clearly understood and readily carried into effect it will now be described by way of example in conjunction with the accompanying drawings, of which:

Figures 1 and 2 show in side elevation and in end elevation, respectively, an aircraft castorable and steerable nose-wheel mounting;

Figure 3:
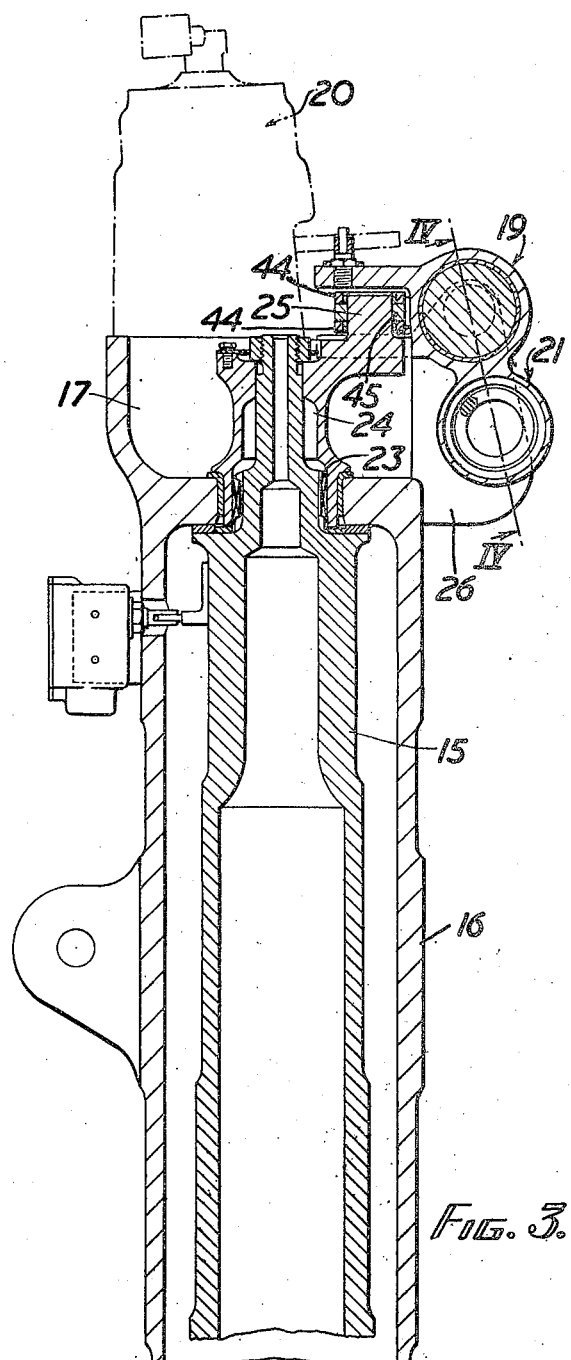
Figure 3 is a sectional side elevation of the upper part of the mounting drawn to an enlarged scale.

In the nose-wheel mounting shown in Figures 1 to 5, twin wheels 11 are journalled on a lever 12 which is pivoted at 13 to the lower end of a bracket 14 which is rigid with a rotatable column 15 borne in a non-rotatable casing 16. The casing 16 is supported near its upper end in trunnion bearings 17 about which the mounting is rotatable by retracting mechanism indicated generally at 18. The upper end of the casing 16 mounts a single double-acting hydraulic cylinder-and-piston device 19, a control and follow-up valve mechanism 20, and self-centering means 21. A shock absorber 22 is arranged between the lever 12 and bracket 14. The specification of the United States Letters Patent No. 2,543,233 above referred to, includes an illustration and description of the hydraulic control mechanism and of the self-centering means 21. The upper end of the rotatable column 15 (see Figure 3 in that patent and in the drawings of the application) is in splined connection at 23 with an extension fitting 24 which has an upstanding crank pin 25 through which the steering control over the column 15 is effected.

Figure 4:
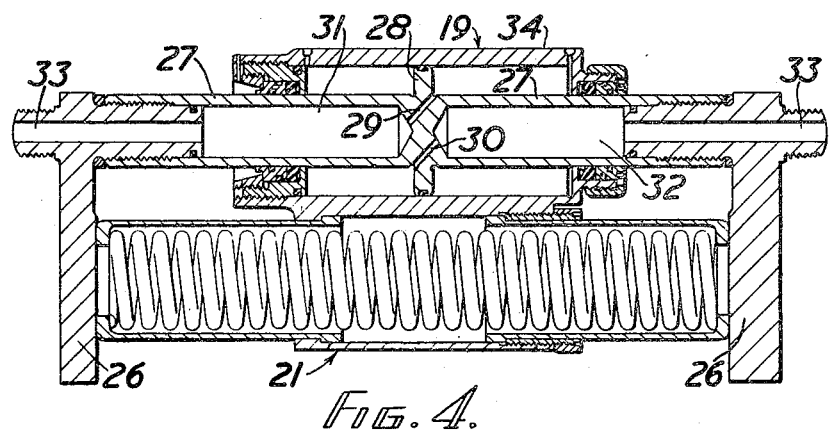
Figure 4 is a sectional view on the line IV—IV in Figure 3.
Figure 5:
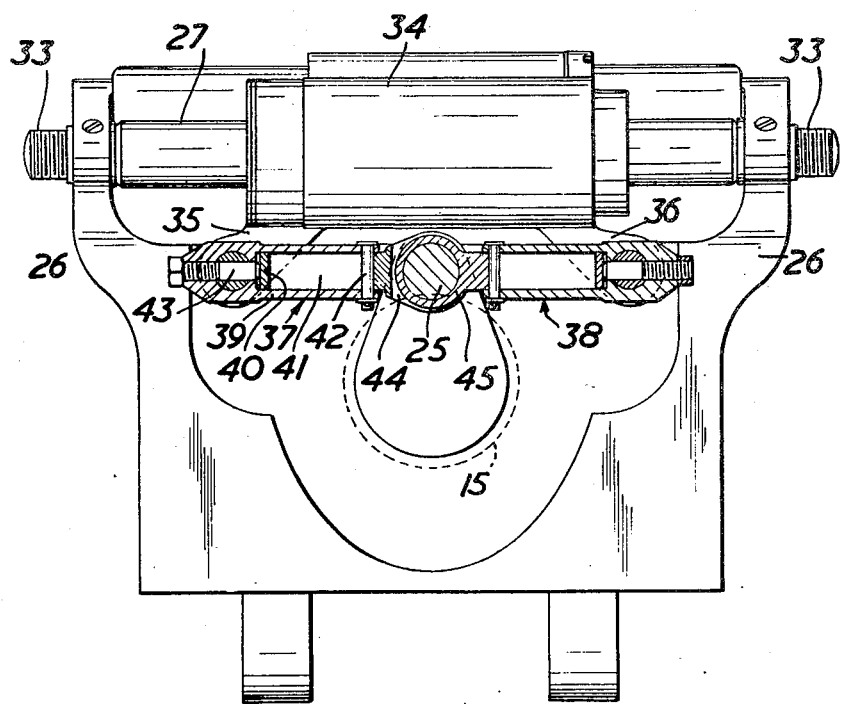
Figure 5 is a part sectional plan view looking down on Figure 3.

The non-rotatable casing 16 has a pair of integral arms 26 between which there extends a fixed hollow rod 27 formed centrally thereof with a piston 28 (see particularly Figure 4). The piston 28 has two restrictions 29 and 30 extending therethrough, the restriction 29 communicating with the hollow 31 within one side of the rod 27 and the restriction 30 communicating with the hollow 32 within the other side of the rod. The arms 26 have nipples 33 for connection with the hydraulic system and through which communication is had with the hollow spaces 31 and 32.

An axially shiftable cylinder 34 fits slidably around the piston 28 and is glanded at its ends on the rod 27. There is integral with the cylinder 34 two pairs of lugs 35 and 36 respectively. An extensible link 37 is pivoted at one end thereof between the lugs 35 and a similar extensible link 38 is pivoted between the lugs 36. The other ends of the links 37 and 38 are pivoted around the crank pin 25 upstanding in effect from the rotatable column 15. The link 37 (see Figure 5) comprises an outer tubular part 39 which is pivotally connected to the lugs 35 and an inner relatively slidable rod 40, connected to the crank pin 21 and slotted at 41 to accommodate a cross pin 42 fixed to the tube 39. The pin 42 limits extension of the link 37, and an adjustable screw 43 limits contraction of the link. The links 37 and 38 are identical with one another except that the rod 40 of the link 37 has forked lugs 44 extending around the pin 25 whereas the corresponding rod of the link 38 has a single lug 45 received between the lugs 44.

When the hydraulic system is operated so that pressure fluid is delivered into the space 31 and allowed to return from the space 32, the cylinder 34 will move to the right as seen in the drawings and the link 37 will firstly act as a rigid link to impart rotary movement to the column 15. While this is taking place, the link 38 will be extending. The reverse will happen when pressure fluid is delivered into the space 32 and allowed to return from the space 31.

Figure 6:
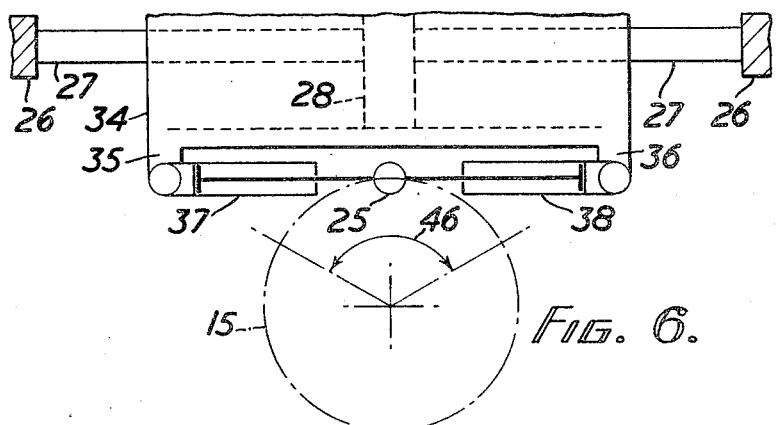
Figures 6 to 11 are diagrams showing how the extensible links extend and contract during steering and castoring of the mounting.
Figure 7:
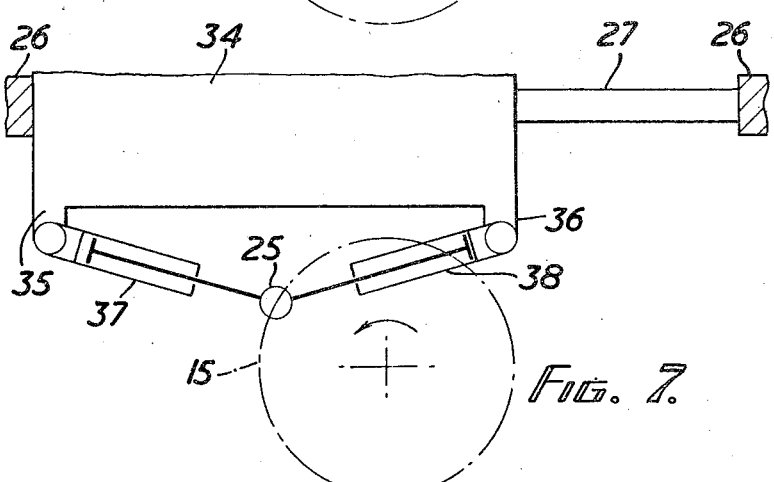
Figure 8:
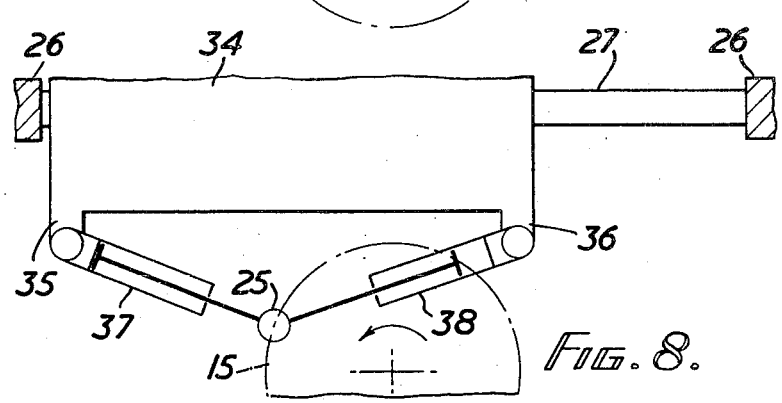
Figure 9:
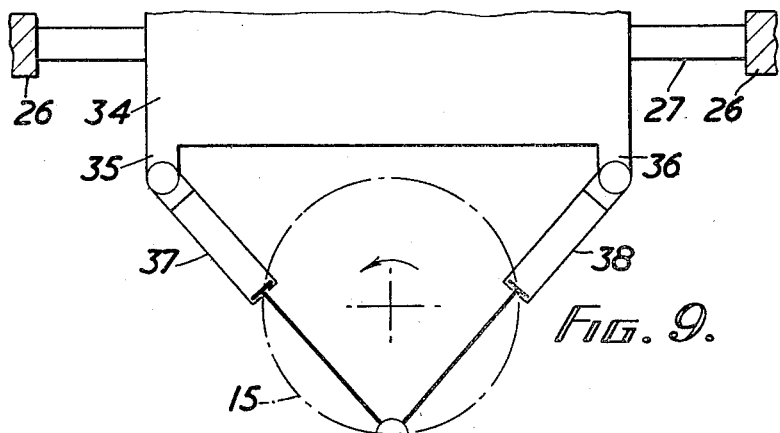
Figure 10:
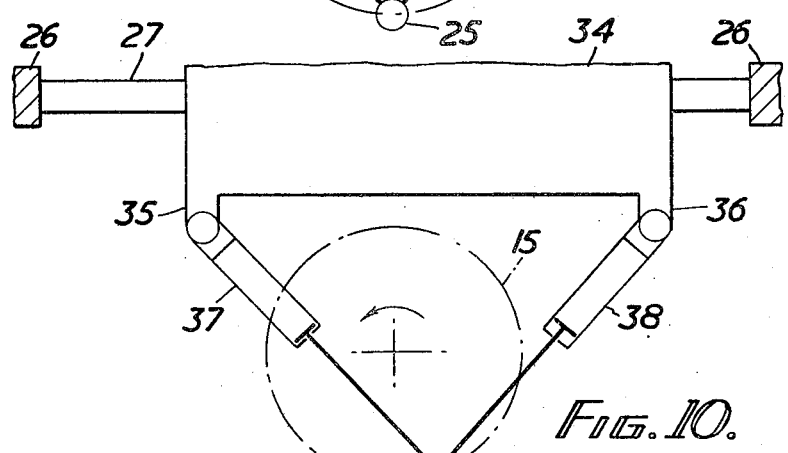
Figure 11:
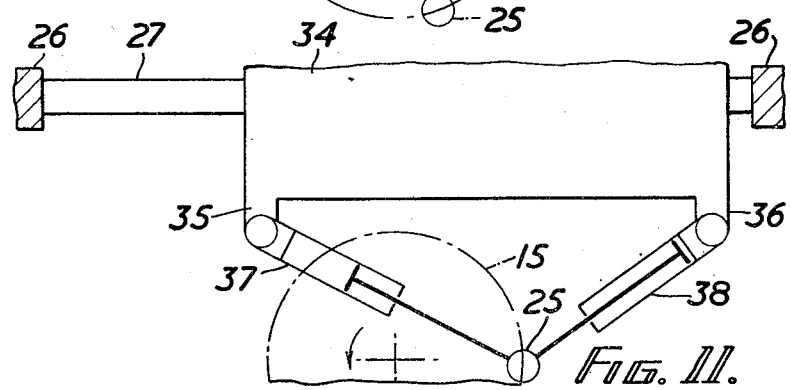

Figure 6 represents the parts in their mid positions at which the twin wheels are directed fore and aft of the aircraft. The arrow 46 represents the full steering range. Figure 7 shows the cylinder 34 moved its fullest extent to the left to give maximum steering in one direction. It will be seen that the link 38 remains fully contracted and that the link 37 has elongated to a small extent. Assuming that the mounting castors in the same direction beyond the steering range, the link 38 will start to elongate, as seen in Figure 8, and the slight elongation of the link 37 will be taken up until the link 37 becomes fully contracted. It will be seen that the cylinder 34 has now moved back a little to the right. By the time the column has turned from the position shown in Figure 6 through 180 degrees to the position shown in Figure 9, the cylinder 34 will be back in its mid position with the links 37 and 38 each substantially fully extended. Continued turning of the column 15 causes the parts to move through the positions shown in Figures 10 and 11 until the parts finally return back to the positions of Figure 6. The full travel of the cylinder 34 to effect full steering is never exceeded, as would be necessary if a single non-extensible link served as the mechanical connection between the cylinder 34 and the pin 25.

When the cylinder 34 is caused to move as a result of castoring of the column 15, the full range of travel of the cylinder 34 will be somewhat less than that when the cylinder 34 is driving the column.

The two extensible links need not necessarily be in alignment when the parts occupy their normal mid positions shown in Figure 6. If desired, the axis of the crank pin 25 may be displaced towards the axis of the rotatable column 15 away from the plane containing the axes of the link pivots with the cylinder.

Although less convenient, the cylinder could be arranged to be stationary with the piston as the movable element. In such an arrangement the extensible links would be pivotally connected with parts movable as one with the piston.

Any shimmy that may develop in the rotatable column usually takes place throughout a range of within four degrees either side of the mid position. When the column turns this small amount, one of the links will remain fully contracted whilst the other will elongate to a negligible extent. Thus during return oscillations the degree of lost motion to be taken up in the course of shimmy damping is so small as to be negligible. It will be understood that when the cylinder-and-piston device operates as a shimmy damper, the device will be full of liquid which has no escape.

In all cases where the cylinder-and-piston device is used for steering, the provision of the two links results in a symmetrical power curve having a high steering torque for a considerable steering angle either side of the mid position.

If the rotatable column is to be capable of 360 degrees castoring, then whether the cylinder-and-piston device be used solely for steering, or solely for shimmy damping, or for both purposes, the provision of links of variable length substantially reduces the necessary travel of the movable part of the device.

I claim:
1. An aircraft wheel mounting comprising a wheel-turning column carrying the wheel, means rotatively supporting said column for turning of the wheel to either side of the straight-ahead position thereof, crank means fixed to said column eccentrically thereof for rotation conjointly therewith, a double-acting hydraulic means comprising coacting hydraulic piston and cylinder elements, one of which is fixed and the other of which is movable with relation thereto, means supporting said piston and cylinder elements in a position offset laterally from the wheel-turning column and disposed for movement of said movable element in opposite senses and in a direction transverse to said column, a pair of extensible links having cooperable elements movable relative to each other between link-extended and link-contracted positions, respectively, means pivotally connecting corresponding ends of said links to said crank means, and means pivotally connecting the opposite ends of said links to said movable element at respective locations spaced apart in the direction of movement of said movable element and causing said links to be fully contracted in the rotated position of said crank means corresponding to the straight-ahead position of the wheel and column, whereby turning of said column and movement of said movable element are coordinated in both senses by transmission of force through one link or the other, respectively, depending upon the rotated position of said column and the rotated sense thereof.

2. The aircraft wheel mounting defined in claim 1, wherein the links extend oppositely in mutual alignment from the crank means and tangentially to the rotary path of the crank means, in the straight-ahead position of the wheel and column, whereby initial transmission of force between the crank means and the movable element in either sense of movement thereof from the corresponding position of the crank means is a maximum.

3. The aircraft wheel mounting defined in claim 1, wherein the wheel is castorable with the column throughout a 360° range, and the crank means, links and connecting means mutually cooperate to permit such castoring, the hydraulic cylinder element having connections for supply of hydraulic pressure fluid to opposite ends thereof selectively to effect a positive hydraulic steering of the wheel through the links over a substantial range on either side of the straight-ahead position of the wheel, and a fluid flow restriction communicating between each such connection and the corresponding ends of the hydraulic cylinder to damp shimmy of the wheel during castoring thereof.

4. An aircraft wheel mounting comprising a wheel-turning column carrying the wheel, means rotatively supporting said column for turning of the wheel to either side of the straight-ahead position thereof, crank means fixed to said column eccentrically thereof for rotation conjointly therewith, said crank means defining a first pivot means rotatable therewith in a circular path about the axis of said column, a double-acting hydraulic means comprising coacting hydraulic piston and cylinder elements, one of which is fixed and the other of which is movable with relation thereto in either sense from a neutral position, means supporting said piston and cylinder elements in a position offset laterally from said column and disposed for movement of said movable element in opposite senses and in a direction transverse thereto, second and third pivot means carried by said movable element at respective locations thereon spaced apart in the direction of movement thereof and in a line substantially tangential to said circular path of said first pivot means, and a pair of extensible links having cooperable elements movable relative to each other and stop means to limit such movement at link-extended and link-contracted positions, respectively, one of said links pivotally interconnecting said first and second pivot means and the other of said links pivotally interconnecting said first and third pivot means, and both of said links being substantially fully contracted against its stop means in the neutral position of said movable element, with said first pivot means substantially midway in the line between said second and third pivot means.

5. The aircraft wheel mounting defined in claim 4, wherein the wheel is castorable with the column throughout a 360° range, and the crank means, links and connecting means mutually cooperate to permit such castoring, the hydraulic cylinder having connections for supply of hydraulic pressure fluid to opposite ends thereof selectively to effect positive hydraulic steering of the wheel through the links over a substantial range on either side of the straight-ahead position of the wheel, and a fluid flow restriction communicating between each such connection and the corresponding ends of the hydraulic cylinder to damp shimmy of the wheel during castoring thereof.

6. An aircraft wheel mounting comprising an upright column carrying the wheel, fixed support means whereby said column is supported for rotation through 360° about its axis, a crank pin fixed to said column eccentrically of the column's axis, a rectilinear guide element offset from the column's axis, and disposed generally perpendicular to and equilaterally at each side of a radius through the crank pin, when the latter is in a position of neutral rotation, a traveler guided on said guide for movement from a neutral position wherein it lies in such radius to positions at either side of such neutral position, hydraulic jack means operatively connected with said traveler for conjoint movement, an extensible and contractible link pivotally connected to the traveler at a point offset to one side of such radius and extending from such point inwardly to the crank pin along a line generally at a right angle to the radius, and pivotally connected to the crank pin, a like extensible and contractible link similarly connected between the crank pin and the traveler at a like point at the opposite side of the radius, stop means incorporated in each of said links to limit their contraction, the two links being of such length that, with the column and its crank pin in such position of neutral rotation and with the traveler in its neutral position, each link is bottomed against further contraction by its stop means, and transverse movement of the traveler in one or the other sense is positively communicated through one or the other link as a thrust force acting to rotate the column through the crank pin.

7. An aircraft wheel mounting as in claim 6, including stop means limiting transverse movement of the traveler to that necessary to produce less than 180° of steering rotation of the column, and wherein the two links are each extensible through a sufficient range to complete 360° rotation of the crank pin in either rotative sense, notwithstanding halting of the transverse movement of the traveler.

8. An aircraft wheel mounting as in claim 6, wherein the points of connection of the links to the traveler and to the crank pin are so chosen that the two links are aligned when parts are in their respective neutral positions.

HENRY R. STRATFORD.

REFERENCES CITED

The following references are of record in the file of this patent:

UNITED STATES PATENTS

| Number | Name | Date |
|---|---|---|
| 2,254,260 | Arcier | Sept. 2, 1941 |
| 2,312,553 | Hudson | Mar. 2, 1943 |
| 2,535,167 | Smith | Dec. 26, 1950 |
| 2,543,233 | Dowty | Feb. 27, 1951 |